July 14, 1925.                                          1,546,012
A. A. DENSLINGER ET AL
CLUTCH OPERATING MECHANISM
Filed April 8, 1922            2 Sheets-Sheet 1
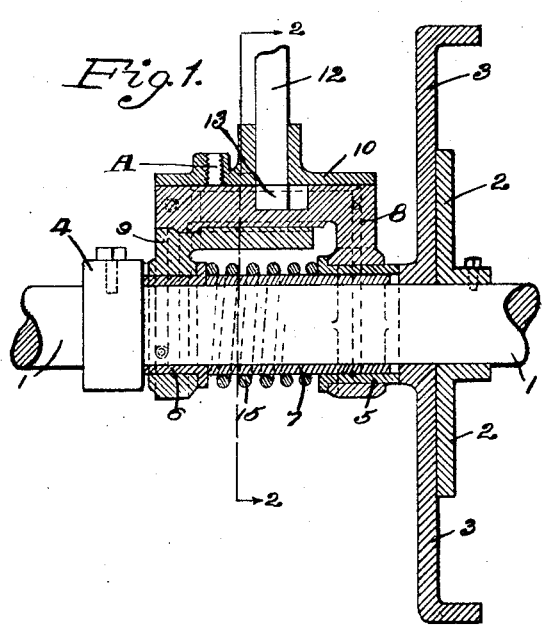
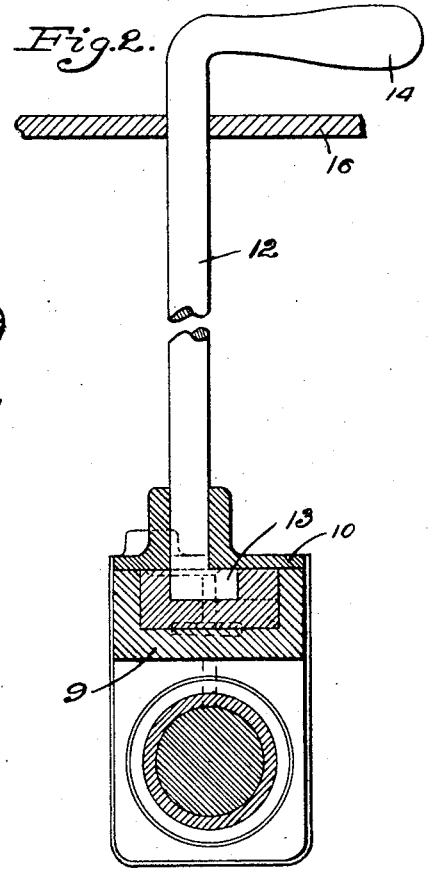
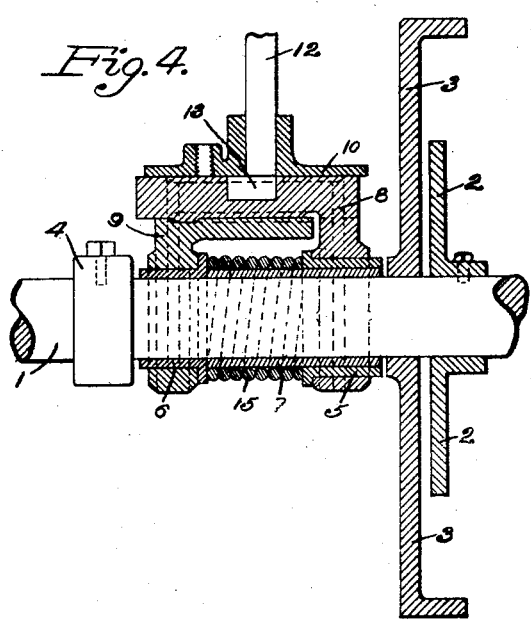
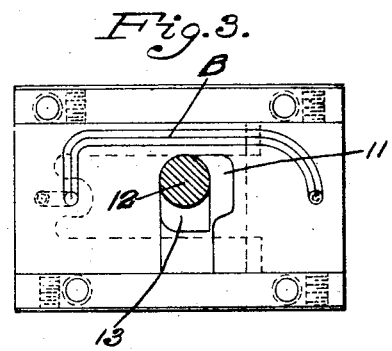
Inventor
Alfred A. Denslinger
Leo Schildknecht
By F. R. Cornwall Atty.

July 14, 1925.  1,546,012
A. A. DENSLINGER ET AL
CLUTCH OPERATING MECHANISM
Filed April 8, 1922    2 Sheets-Sheet 2
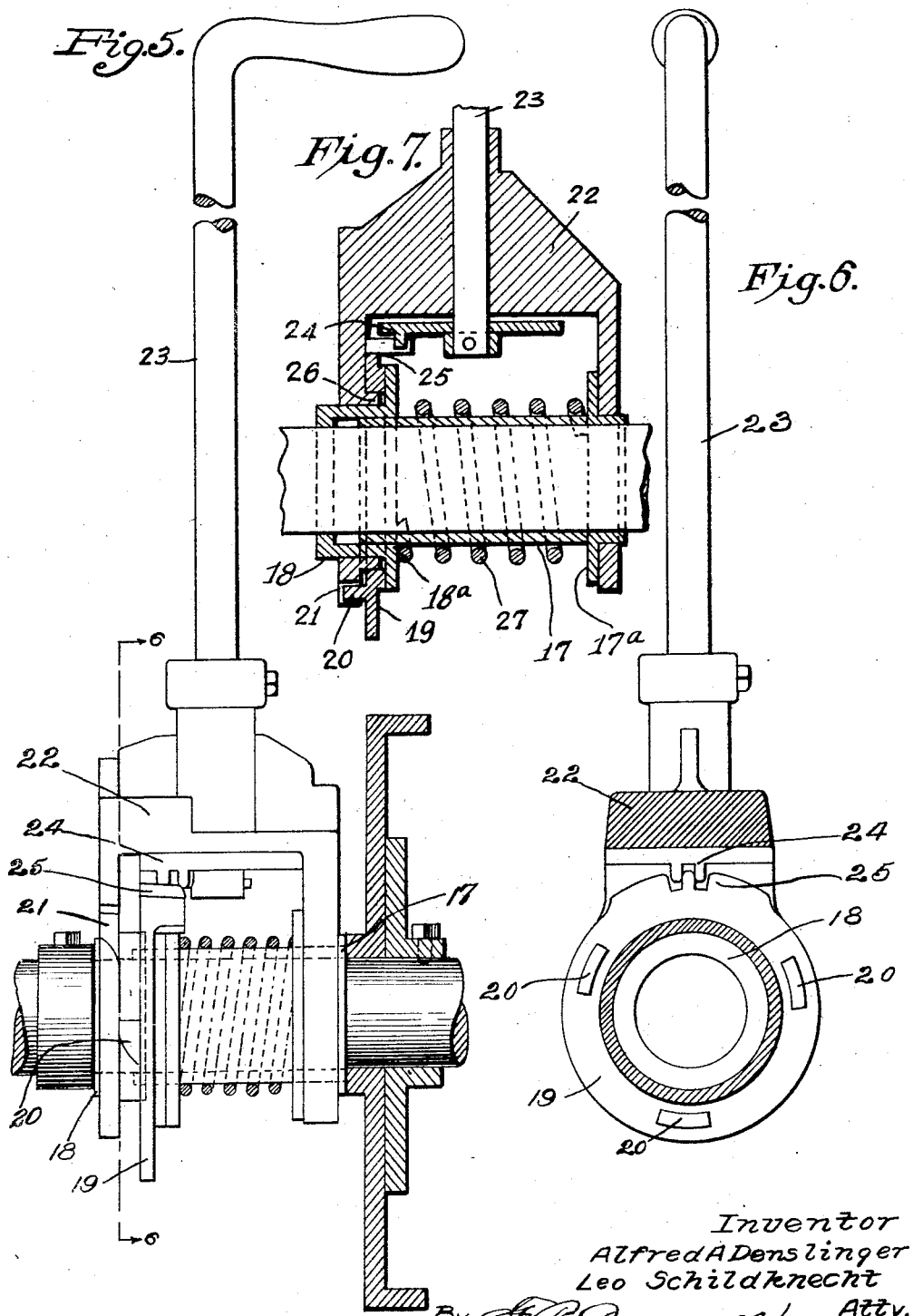

Patented July 14, 1925.

1,546,012

UNITED STATES PATENT OFFICE.

ALFRED A. DENSLINGER, OF PHILADELPHIA, PENNSYLVANIA, AND LEO SCHILD-KNECHT, OF ST. LOUIS, MISSOURI, ASSIGNORS TO LANDIS MACHINE COMPANY, OF ST. LOUIS, MISSOURI, A CORPORATION OF MISSOURI.

CLUTCH-OPERATING MECHANISM.

Application filed April 8, 1922. Serial No. 550,654.

*To all whom it may concern:*

Be it known that we, ALFRED A. DENSLINGER and LEO SCHILDKNECHT, citizens of the United States, residing at Philadelphia, Pennsylvania, and St. Louis, Missouri, respectively, have invented a certain new and useful Improvement in Clutch-Operating Mechanism, of which the following is a full, clear, and exact description, such as will enable others skilled in the art to which it appertains to make and use the same, reference being had to the accompanying drawings, forming part of this application.

Our invention relates to clutch operating mechanism such as may be used on almost any type of machinery which has a clutch resembling that shown in Figure 1, in which a positively rotated disc may be frictionally engaged by a floating disc, the clutch operating mechanism serving to control this engagement.

The object of our invention is to provide a simpler operating device than those with which we are familiar, and to provide a clutch mechanism in which wear will not affect the efficiency nor require frequent adjustment.

In the accompanying drawings, which illustrate embodiments of our invention,—

Figure 1 is a longitudinal section through a clutch operated by our mechanism, showing the clutch engaged.

Figure 2 is a transverse section through the operating mechanism and the shaft upon which it is mounted and is taken on line 2—2 of Figure 1.

Figure 3 is a top view of the mechanism.

Figure 4 is another longitudinal section similar to Figure 1, but showing the clutch disengaged.

Figures 5 and 6 illustrate a modified construction of our invention, Figure 6 being taken on line 6—6 of Figure 5.

Figure 7 is a vertical longitudinal section through the modification illustrated in Figures 5 and 6.

In Figure 1 the clutch is shown mounted upon a driving shaft 1 and includes a disc 2 fixed upon the shaft and a pulley 3 rotatably mounted upon the shaft, the disc and pulley having opposed faces adapted to be frictionally engaged by the clutch operating mechanism. Spaced from pulley 3 is a collar 4 also fixed upon the shaft and between pulley 3 and collar 4 are two sleeves 5 and 6 bearing against the sides of pulley 3 and collar 4, respectively. Sleeve 5 is mounted upon a bushing 7 while sleeve 6 is mounted upon the shaft.

It will be understood that the shaft rotates freely in the bushing and sleeve 6. Two angular members 8 and 9 are mounted on sleeves 5 and 6, respectively, their horizontal legs extending toward each other and being overlapped as shown in Figure 1. The leg of member 8 is narrower than the leg of member 9 and the latter is recessed, as best shown in Figure 2, to slidably receive the leg of member 8. A cap 10 fits over the horizontal legs of the members and is secured to the sides of the horizontal leg of member 9.

The upper face of the horizontal leg of member 8 is provided with a recess 11, best shown in Figure 3, and journaled in cap 10 is a rod 12, the lower end of which is provided with a toe 13 seated in recess 11 and adapted to bear against the sides of the latter. The upper end of rod 12 is provided with a handle 14, whereby the rod may be turned in either direction. Toe 13 forms a cam and the wall of recess 11 forms a cam follower whereby rotation of the rod will shift members 8 and 9 longitudinally of shaft 1 and relatively to each other. Recess 11 is widened adjacent the end of rod 12 to permit movement of member 8 longitudinally of the shaft and relatively to rod 12.

Compressed between sleeves 5 and 6 is a coil spring 15 which tends to thrust the sleeves apart and when permitted to so function, presses pulley 3 against disc 2, causing the pulley to rotate with the shaft. The spring may so function when the toe of rod 12 is turned transversely of the shaft axis, as indicated in Figures 1, 2 and 3.

When rod 12 and its toe 13 are turned as indicated in Figure 4, members 8 and 9 are telescoped, compressing the spring 15 and removing the pressure against pulley 3, permitting the latter to separate from disc 2 and no longer be rotated by the latter.

It will be understood that the shaft is driven by any suitable power and that the machinery to be operated is connected to pulley 3.

A suitable oil cup may be screwed into the threaded hole A in cap 10 and oil grooves B are provided in members 8 and 9, whereby the bearings of the elements of the operating mechanism on shaft 1 may be suitably lubricated.

The outer end of handle 12 will be loosely journaled in some member of the frame of the machine of which the clutch forms a part to prevent the rotation of the operating mechanism with the shaft. Such bearing is indicated by the fragmentary section 16 of Figure 2.

In the construction shown in Figures 5, 6, and 7, a long sleeve 17 telescopes with a short sleeve 18. Sleeve 17 extends through the righthand leg of a U-shaped housing 22 and sleeve 18 similarly extends through the lefthand leg of housing 22 and is slidable therein. A flange 17ª near the righthand end of sleeve 17 engages the inner face of the adjacent leg of the housing 22. A flange 18ª on sleeve 18 is spaced from the adjacent leg of housing 22 by a member 19 which is journaled upon an annular boss 26 formed on the lefthand leg of member 22 and surrounding sleeve 18. Member 19 is provided with three cams 20 adapted to project through slots 21 in the leg of housing 22 when radially aligned therewith. With the parts in the position shown in Figure 7, if member 19 be rotated on boss 26, the inclined faces of cams 20 and slots 21 force the cams to the right and out of the slots and move member 19 and sleeve 18 to the right against the pressure of the coil spring 27, thus reducing the overall distance between the outer ends of sleeves 17 and 18 and removing the pressure between the driving and driven clutch members on the shaft. Member 19 may be rotated on boss 26 by means of a toothed element 24 fixed on the lower end of the operating rod 23 and in mesh with a segment 25 on member 19. The spaces between the teeth in member 25 which mesh with the teeth of element 24 are elongated so as to accommodate the element teeth irrespective of the movement of member 19 axially of the shaft.

Other modifications of our mechanism will suggest themselves to those familiar with the art without substantial departure from the spirit of our invention as expressed in the following claims:

What we claim is:

1. In combination, a rotatable shaft and a clutch mechanism comprising spaced collars secured to said shaft, a pulley rotatably mounted on said shaft between said collars and adjacent to one of them, members slidably mounted on said shaft and located between the other collar and said pulley and having an extended bearing on each other longitudinally of the shaft, a spring compressed between said members and a rod extending outwardly from the shaft, and means operated by rotation of said rod for moving said members toward each other.

2. In a clutch operating mechanism, spaced members adapted to be loosely mounted on a shaft to have relative movement to and from each other longitudinally of the shaft, means yieldingly thrusting said members apart, cams for moving said members toward each other, and manually operable means rotatable on one of said members for actuating said cams.

3. A clutch mechanism comprising spaced collars secured to a rotating shaft, a pulley rotatably mounted on the shaft between said collars and adjacent to one of them, members slidably mounted on the shaft between the other collar and said pulley, a spring compressed between said members, a rod extending outwardly from the shaft, and means operated by rotation of said rod for moving said members toward each other.

4. A clutch device adapted to be positioned and to function at any desired point on a shaft irrespective of external apparatus and comprising spaced collars, shaft engaging elements on said collars, a freely rotatable pulley between said collars, a pair of shaft encircling members between said pulley and one of said collars, a spring between said members, and a manually manipulative operating element journaled on one of said members for camming said members toward each other against the compression of said spring.

5. In a clutch, a shaft, spaced collars secured thereon, a pulley rotatably mounted on said shaft between said collars and adjacent to one of them, non-rotatable members slidable longitudinally on said shaft and adapted to engage said pulley and one of said collars, respectively, a manually operable element rotatably mounted on one of said members and projecting at right angles to the shaft, and means actuated by rotation of said element to shift said members longitudinally of the shaft.

In testimony whereof we hereunto affix our signatures this 3d day of April, 1922.

ALFRED A. DENSLINGER.
LEO SCHILDKNECHT.